United States Patent
Thomas et al.

(10) Patent No.: US 12,387,717 B2
(45) Date of Patent: Aug. 12, 2025

(54) MULTI-SPEAKER DATA AUGMENTATION FOR IMPROVED END-TO-END AUTOMATIC SPEECH RECOGNITION

(71) Applicant: International Business Machines Corporation, Armonk, NY (US)

(72) Inventors: Samuel Thomas, White Plains, NY (US); Hong-Kwang Kuo, Pleasantville, NY (US); George Andrei Saon, Stamford, CT (US); Brian E. D. Kingsbury, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 18/129,328

(22) Filed: Mar. 31, 2023

(65) Prior Publication Data
US 2024/0331684 A1 Oct. 3, 2024

(51) Int. Cl.
*G10L 15/16* (2006.01)
*G10L 15/02* (2006.01)
*G10L 15/06* (2013.01)

(52) U.S. Cl.
CPC ............ *G10L 15/16* (2013.01); *G10L 15/02* (2013.01); *G10L 15/063* (2013.01)

(58) Field of Classification Search
CPC ........ G10L 15/16; G10L 15/02; G10L 15/063
See application file for complete search history.

(56) References Cited

U.S. PATENT DOCUMENTS

| | | | |
|---|---|---|---|
| 9,269,073 B2 | 2/2016 | Sammon et al. | |
| 2019/0189111 A1* | 6/2019 | Watanabe | G10L 15/16 |
| 2019/0318725 A1* | 10/2019 | Le Roux | G10L 17/00 |
| 2021/0312905 A1 | 10/2021 | Zhao et al. | |

OTHER PUBLICATIONS

Janne PylkkÅNonen, Antti Ukkonen, Juho Kilpikoski, Samu Tamminen, and Hannes Heikinheimo, "Fast text-only domain adaptation of RNN-Transducer prediction network," in Proc. Interspeech, 2021. pp. 5.

(Continued)

*Primary Examiner* — Ibrahim Siddo
(74) *Attorney, Agent, or Firm* — Kristofer Haggerty; Otterstedt & Kammer PLLC (57) ABSTRACT

Features of two or more single speaker utterances are concatenated together and corresponding labels of the two or more single speaker utterances are concatenated together. Single speaker acoustic embeddings for each of the single speaker utterances of the concatenated single speaker utterances are generated using a single speaker teacher encoder network. An enhanced model is trained on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network.

20 Claims, 6 Drawing Sheets

(56) References Cited

OTHER PUBLICATIONS

Alex Graves, "Sequence transduction with recurrent neural networks," arXiv preprint arXiv:1211.3711, 2012. pp. 9.

Arun Narayanan, Rohit Prabhavalkar, Chung-Cheng Chiu, David Rybach, Tara N Sainath, and Trevor Strohman, "Recognizing long-form speech using streaming end-to-end models," in Proc. ASRU, 2019. pp. 8.

Daniel S Park, William Chan, Yu Zhang, Chung-Cheng Chiu, Barret Zoph, Ekin D Cubuk, and Quoc V Le, "SpecAugment: A simple data augmentation method for automatic speech recognition," in Proc. Interspeech, 2019. pp. 6.

Erik McDermott, Hasim Sak, and Ehsan Variani, "A density ratio approach to language model fusion in end-to-end automatic speech recognition," in Proc. ASRU, 2019. pp. 8.

Gakuto Kurata, George Saon, Brian Kingsbury, David Haws, and ZoltÅLan TÅNuske, "Improving customization of neural transducers by mitigating acoustic mismatch of synthesized audio," in Proc. Interspeech, 2021. pp. 5.

George Saon, ZoltÅLan TÅNuske, Daniel Bolanos, and Brian Kingsbury, "Advancing RNN transducer technology for speech recognition," in Proc. ICASSP, 2021. pp. 5.

George Saon, ZoltÅLan TÅNuske, Kartik Audhkhasi, and Brian Kingsbury, "Sequence noise injected training for end-to-end speech recognition," in Proc. ICASSP, 2019. pp. 5.

Jinyu Li, Rui Zhao, Hu Hu, and Yifan Gong, "Improving RNN transducer modeling for end-to-end speech recognition," in Proc. ASRU, 2019. pp. 8.

Kanishka Rao, Has.im Sak, and Rohit Prabhavalkar, "Exploring architectures, data and units for streaming end-to-end speech recognition with RNN-transducer," in Proc. ASRU, 2017. pp. 7.

Aurent El Shafey, Hagen Soltau, and Izhak Shafran, "Joint speech recognition and speaker diarization via sequence transduction," in Proc. Interspeech, 2019. pp. 5.

Mohammadreza Ghodsi, Xiaofeng Liu, James Apfel, Rodrigo Cabrera, and Eugene Weinstein, "RNN-transducer with stateless prediction network," in Proc. ICASSP, 2020. pp. 5.

Nitish Srivastava, Geoffrey Hinton, Alex Krizhevsky, Ilya Sutskever, and Ruslan Salakhutdinov, "Dropout: a simple way to prevent neural networks from overfitting," The journal of machine learning research, vol. 15, No. 1, pp. 1929-1958, 2014. pp. 30.

Samuel Thomas, Brian Kingsbury, George Saon, and Hong-Kwang J Kuo, "Integrating text inputs for training and adapting RNN transducer ASR models," in Proc. ICASSP, 2022. pp. 5.

Tom Ko, Vijayaditya Peddinti, Daniel Povey, and Sanjeev Khudanpur, "Audio augmentation for speech recognition," in Proc. Interspeech, 2015. pp. 4.

Xiaodong Cui, George Saon, Tohru Nagano, Masayuki Suzuki, Takashi Fukuda, Brian Kingsbury, and Gakuto Kurata, "Improving generalization of deep neural network acoustic models with length perturbation and n-best based label smoothing," in Proc. Interspeech, 2022. pp. 5.

Yanzhang He, Tara N Sainath, Rohit Prabhavalkar, Ian McGraw, Raziel Alvarez, Ding Zhao, David Rybach, Anjuli Kannan, Yonghui Wu, Ruoming Pang, et al., "Streaming end-to-end speech recognition for mobile devices," in Proc. ICASSP, 2019. pp. 5.

Zhiyun Lu, Yanwei Pan, Thibault Doutre, Parisa Haghani, Liangliang Cao, Rohit Prabhavalkar, Chao Zhang, and Trevor Strohman, "Input length matters: Improving RNN-T and MWER training for long-form telephony speech recognition," arXiv preprint arXiv:2110.03841, 2021. pp. 6.

Zhong Meng, Sarangarajan Parthasarathy, Eric Sun, Yashesh Gaur, Naoyuki Kanda, Liang Lu, Xie Chen, Rui Zhao, Jinyu Li, and Yifan Gong, "Internal language model estimation for domain-adaptive end-to-end speech recognition," in Proc. SLT, 2021. pp. 8.

\* cited by examiner

FIG. 1

Algorithm 1 Multi-speaker data augmentation
---

1:  $D \leftarrow$ A batch of speech utterances
2:  $L \leftarrow$ Total number of utterances in the batch
3:  $c \leftarrow$ Max. number of speaker changes
4:  $sc \leftarrow$ Speaker change label
5:  for $i \leftarrow 0...L$ do
6:      $u_i \leftarrow D[i]$
7:      $logm_i \leftarrow$ log-mel features of $u_i$
8:      $lab_i \leftarrow$ label sequence of $u_i$
9:      $n \leftarrow$ randomly generate an integer $x \in [0, c]$
10:    $ulist_i \leftarrow \{\}$     ▷ list of utts augmented together
11:    $ulist_i \leftarrow ulist_i.\text{append}(u_i)$
12:    for $j \leftarrow 0...n$ do
13:        Randomly select a novel utterance $v_j \in D$
14:        $logm_j \leftarrow$ log-mel features of $v_j$
15:        $lab_j \leftarrow$ label sequence of $v_j$
16:        $logm_i \leftarrow [logm_i, logm_j]$     ▷ concat feats
17:        $lab_i \leftarrow [lab_i, sc, lab_j]$     ▷ concat labs
18:        $ulist_i \leftarrow ulist_i.\text{append}(v_j)$
19:    end for
20:    $acts_i \leftarrow \textbf{ssp-acts}(ulist_i)$     ▷ Acts. from SSP encoder
21:    $logm_i \leftarrow \textbf{spec-aug}(logm_i)$     ▷ Spec-augmentation
22:    $logm_i \leftarrow logm_i + \Delta + \Delta^2$     ▷ append $\Delta$ and $\Delta^2$
23:  end for
24:  function SSP-ACTS(*utts*)
25:      $N \leftarrow$ Total number of utterances in *utts*
26:      $\textbf{ssp-encode}() \leftarrow$ Single speaker encoder model
27:      $embd \leftarrow \{\}$     ▷ concatenated encoder embeddings
28:      for $k \leftarrow 0...N$ do
29:         $embd \leftarrow embd.\text{append}(\text{ssp-encode}(utts[k]))$
30:      end for
31:  end function

*FIG. 2*

| Model | First Conventional Dataset | | | Second Conventional Dataset | | | Third Conventional Dataset | | | CC | | |
|---|---|---|---|---|---|---|---|---|---|---|---|---|
| | SP | M1 | M2 | SP | M1 | M2 | SP | M1 | M2 | SP | M1 | M2 |
| SNG | 8.5 (1C -6.5/2C-10.5) | 9.2 | 10.9 | 9.4 | 10.0 | 10.9 | 8.7 | 9.6 | 11.6 | 29.8 | 30.6 | 33.2 |
| MLT-MSE | 7.9 (1C -6.1/2C -9.8) | 8.5 | 9.5 | 8.9 | 9.2 | 9.8 | 8.2 | 8.6 | 10.0 | 27.5 | 27.3 | 29.5 |

FIG. 3

| Metric | SNG | | | MLT | | | MLT-MSE | | |
|---|---|---|---|---|---|---|---|---|---|
| | SP | M1 | M2 | SP | M1 | M2 | SP | M1 | M2 |
| WER% | 8.7 | 9.6 | 11.6 | 8.2 | 8.8 | 10.1 | 8.2 | 8.6 | 10.0 |
| D > 3 | 14 | 51 | 116 | 17 | 52 | 106 | 19 | 46 | 76 |
| D > 4 | 5 | 25 | 75 | 7 | 27 | 72 | 8 | 19 | 43 |
| D > 5 | 1 | 11 | 50 | 2 | 15 | 49 | 1 | 10 | 27 |

Model = SNG, testset = RT03-SP, WER 8.7%
[1] 04571-sw_45355_319.49-323.79
REF: i do not know about six hundred dollars
HYP: i do not know about six hundred dollars Model = SNG, testset = RT03-M1, WER = 9.6%
[1+2] 04571-sw_45355_319.49-323.79+04572-sw_45355_323.59-325.47
REF: i do not know about six hundred dollars LIKE IS IT THE SAME THING AS THIS ONE OR NO
HYP: i do not know about six hundred dollars **  *  *     * **

Model = MLT-MSE, testset = RT03-M1, WER = 8.6%
[1+2] 04571-sw_45355_319.49-323.79+04572-sw_45355_323.59-325.47
REF: i do not know about six hundred dollars like is it the same thing AS this ONE or no
HYP: i do not know about six hundred dollars like is it the same thing AT this POINT or no Model = SNG, testset = RT03-SP, WER = 8.7%
[2] 04572-sw_45355_323.59-325.47
REF: like is it the same thing as this one or no
HYP: like is it the same thing as this one or no

*FIG. 4A*

| Model | M1=2utt | 3utt | 4utt | M2=R2utt | R3utt |
|---|---|---|---|---|---|
| SNG | 9.6 | 9.9 | 10.3 | 11.6 | 13.0 |
| MLT-MSE | 8.6 | 8.8 | 8.9 | 10.0 | 10.7 |

FIG. 4B

| Model | Collar-0 | Collar-1 | Collar-2 | Collar-3 |
|---|---|---|---|---|
| MLT-MSE | 0.0317 | 0.1187 | 0.4493 | 0.5309 |
| CTC-2K | 0.5241 | 0.7442 | 0.8531 | 0.8839 |

FIG. 4C

| Model | P-UTT | P-SPK-UTT |
|---|---|---|
| SNG | 9.1 (7.2/10.9) | 8.2 (6.3/10.1) |
| MLT-MSE | 8.0 (6.4/9.6) | 7.7 (6.0/9.4) |
| Adpt-MLT-MSE | 7.9 (6.3/9.5) | 7.6 (5.9/9.3) |

MULTI-SPEAKER DATA AUGMENTATION FOR IMPROVED END-TO-END AUTOMATIC SPEECH RECOGNITION

BACKGROUND

The present invention relates generally to the electrical, electronic and computer arts and, more particularly, to computer-implemented automatic speech recognition.

With their remarkable performance and simplified training pipeline, end-to-end (E2E) models have become the de-facto approach to automatic speech recognition (ASR). Among various E2E models, Recurrent Neural Network-Transducer (RNN-T) models, a class of end-to-end, streamable, all-neural models, have been widely adopted for speech recognition. When RNN-T models are trained for conversational telephone speech recognition on publicly available datasets (which are based on clean, short duration, single speaker utterances collected on separate channels), these models achieve state-of-the-art results on matched test sets. Performance, however, degrades when the utterance length increases, when the test utterance is a recording of multiple speakers, or when the acoustic conditions in the test are mismatched with the training data.

Publicly available datasets traditionally used to train end-to-end (E2E) automatic speech recognition (ASR) models for conversational telephone speech recognition are based on clean, short duration, single speaker utterances collected on separate channels. While E2E ASR models achieve state-of-the-art performance on recognition tasks that match well with such training data, they are observed to sometimes fail on test recordings that contain multiple speakers and/or significant channel or background noise, or that span longer durations than training data utterances.

BRIEF SUMMARY

Principles of the invention provide techniques for multi-speaker data augmentation for improved end-to-end automatic speech recognition. In one aspect, an exemplary method includes the operations of concatenating, using a hardware processor, features of two or more single speaker utterances together and concatenating, using the hardware processor, corresponding labels of the two or more single speaker utterances together; generating, using the hardware processor and a single speaker teacher encoder network, single speaker acoustic embeddings for each of the single speaker utterances of the concatenated single speaker utterances; and training, using the hardware processor, an enhanced model on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network.

In one aspect, an exemplary method includes the operations of splitting, using a hardware processor, features of a given single speaker utterance into two or more utterances and using labeling of the given single speaker utterance; generating, using the hardware processor and a single speaker teacher encoder network, single speaker acoustic embeddings of the given single speaker utterance; and training, using the hardware processor, an enhanced model on the split single speaker utterances using a classification loss $L_{CLASS}$ and a representation similarity loss $L_{REP}$, the representation similarity loss $L_{REP}$ defined to influence an embedding derived from the split single speaker utterances, the influence being based on the single speaker acoustic embeddings derived from the single speaker teacher encoder network In one aspect, a computer program product comprises one or more tangible computer-readable storage media and program instructions stored on at least one of the one or more tangible computer-readable storage media, the program instructions executable by a processor, the program instructions comprising concatenating features of two or more single speaker utterances together and concatenating corresponding labels of the two or more single speaker utterances together; generating, using a single speaker teacher encoder network, single speaker acoustic embeddings for each of the single speaker utterances of the concatenated single speaker utterances; and training an enhanced model on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network.

In one aspect, a system comprises a memory and at least one processor, coupled to the memory, and operative to perform operations comprising concatenating features of two or more single speaker utterances together and concatenating corresponding labels of the two or more single speaker utterances together; generating, using a single speaker teacher encoder network, single speaker acoustic embeddings for each of the single speaker utterances of the concatenated single speaker utterances; and training an enhanced model on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:
  improves the technological process of computerized speech recognition by transforming single speaker training data into multiple speaker data by, for example, appending together multiple single speaker utterances in a novel manner;
  a 7-14% relative improvement on various single speaker and multiple speaker test sets;
  improves speech recognition performance by up to 14% by capturing useful information from preceding spoken utterances used as dialog history;

an on-the-fly data augmentation method where random speech segments are combined to construct longer multi-speaker utterances;

improved machine learning model robustness to speaker changes and longer speech utterances;

a teacher model trained on single speaker utterances for mapping its multi-speaker encoder embeddings to better performing single speaker representations;

fewer deletion errors when utterances contain speaker changes or have long duration;

easy integration into existing speech feature extraction processes for training E2E models; and a method that encourages machine learning models to learn useful knowledge from preceding spoken utterances (when used as dialog history).

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Generally, publicly available datasets traditionally used to train end-to-end (E2E) automatic speech recognition (ASR) models for conversational telephone speech recognition are based on clean, short duration, single speaker utterances collected on separate channels. While E2E ASR models achieve state-of-the-art performance on recognition tasks that match well with such training data, they are observed to fail on test recordings that contain multiple speakers and/or significant channel or background noise, or that span longer durations than training data utterances. To mitigate these issues, an on-the-fly data augmentation strategy that advantageously transforms single speaker training data into multiple speaker data by, for example, appending together multiple single speaker utterances, is disclosed. Example embodiments encourage the E2E model to become robust to speaker changes and also to process longer utterances effectively. During training, the model is also guided by a teacher model trained on single speaker utterances to map its multi-speaker encoder embeddings to better performing single speaker representations. With example embodiments, a 7-14% relative improvement on various single speaker and multiple speaker test sets was obtained. We have found that example embodiments improved recognition performance by up to 14% by capturing useful information from preceding spoken utterances used as dialog history.

Introduction

With their remarkable performance and simplified training pipeline, end-to-end (E2E) models have become the de-facto approach to automatic speech recognition (ASR). Among various E2E models, RNN-Transducer (RNN-T) models, a class of end-to-end, streamable, all-neural models, have been widely adopted for speech recognition. When RNN-T models are trained for conversational telephone speech recognition on publicly available datasets (which are based on clean, short duration, single speaker utterances collected on separate channels), these models achieve state-of-the-art results on matched test sets. Performance, however, degrades when the utterance length increases, when the test utterance is a recording of multiple speakers, or when the acoustic conditions in test are mismatched with the training data.

In one example embodiment, a technique is disclosed that encourages E2E models to become robust to speaker changes and to process longer utterances effectively. Unlike conventional techniques, in accordance with one or more embodiments, an on-the-fly augmentation method combines random segments to construct longer multi-speaker utterances. In this aspect, existing data is hence better utilized to improve model robustness. During training, the model is also guided by a teacher model trained on single speaker utterances to map its multi-speaker encoder embeddings to better performing single speaker representations. It has been found that this teacher guided training is an improvement over prior art techniques where utterances are only concatenated. By training models using embodiments of the developed multi-speaker data augmentation scheme, it has been found that, during test time, utterances that contain speaker changes or have long duration are processed more robustly, resulting in many fewer deletion errors. In an interesting extension to this training methodology, it has been found that this training method can be used to encourage models to learn useful knowledge from preceding spoken utterances when used as dialog history.

It is worth noting that in one or more embodiments, the RNN-T model trained with the exemplary data augmentation technique is trained on a combined loss $L=L_{RNNT}+\alpha L_{MSE}$, where $\alpha$ is a weight empirically selected to scale both losses to similar dynamic range as well as balance the contribution of each loss. This training objective is different from the prior art where long-form training examples are also created and two training objectives, the RNN-T loss and the minimum word error rate (MWER) loss, are combined in a two stage training recipe. Further, one or more embodiments provide teacher guided training which improved upon prior art techniques, where utterances are only concatenated. Given the teachings herein, the skilled artisan can select appropriate $\alpha$ values for a desired domain using suitable heuristics and the like.

RNN Transducers

Figure 1:
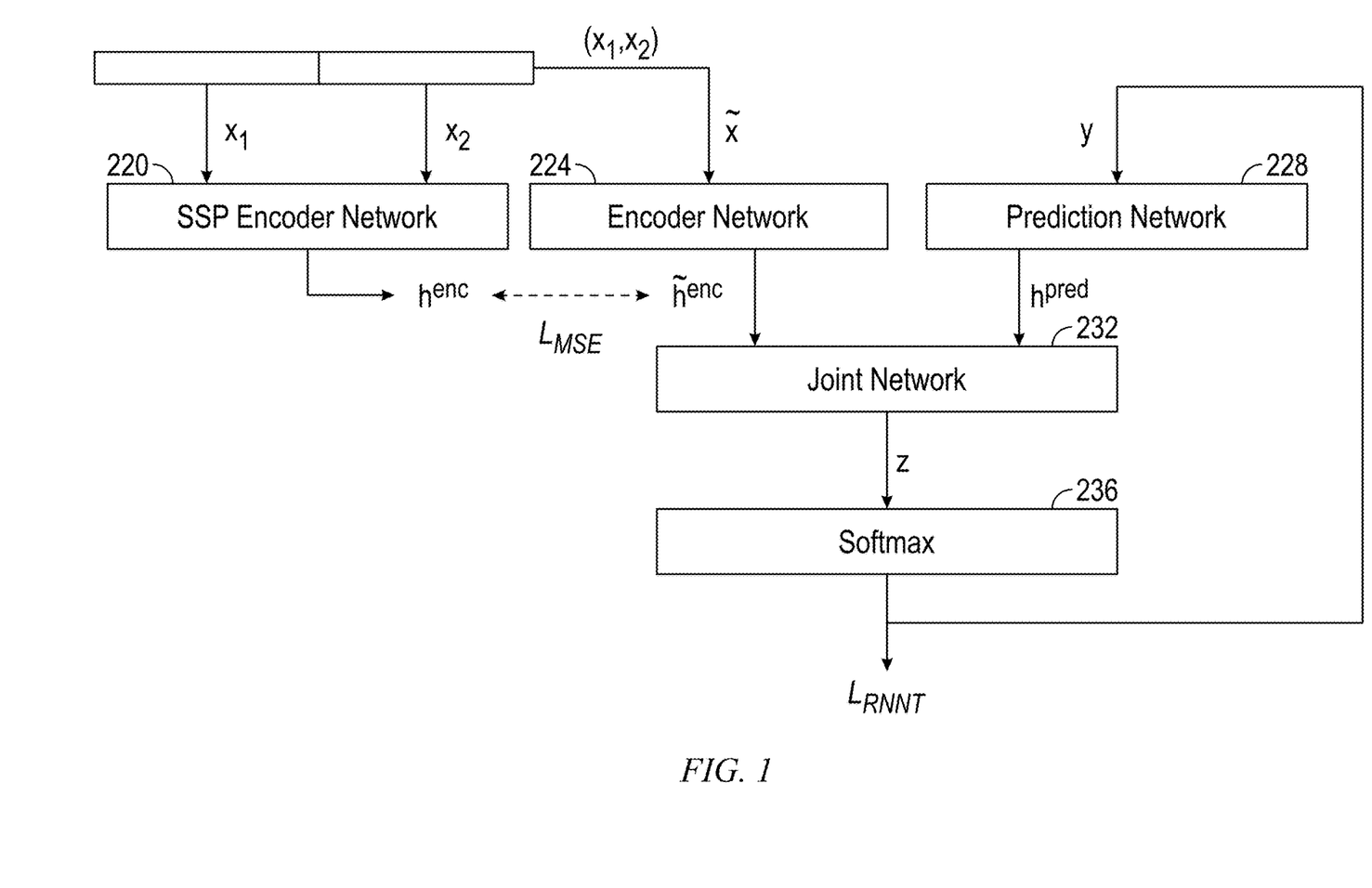
FIG. 1 is a block diagram of an architecture of an automatic speech recognition (ASR) RNN-T model with an additional training loss that maps multi-speaker embeddings to corresponding single speaker embeddings, in accordance with an example embodiment.

FIG. 1 is a block diagram of an architecture of an ASR RNN-T model with an additional training loss that maps multi-speaker embeddings to corresponding single speaker embeddings, in accordance with an example embodiment. RNN-T models, such as single speaker models (that is, a model trained primarily on single speaker training data), typically include three different sub-networks (neural networks): an encoder network 224, a prediction network 228, and a joint network 232, as shown in FIG. 1. The encoder network 224 (also referred to as the transcription network) produces acoustic embeddings, while the prediction network 228 resembles a language model in that it is conditioned on previous non-blank symbols produced by the model. The joint network 232 combines the two embedding outputs to produce a posterior distribution over the output symbols. A softmax function 236 (i.e., a normalized exponential function that converts a vector of real numbers into a probability distribution of possible outcomes) then operates on the produced posterior distribution to generate a negative log-likelihood loss ($L_{RNNT}$). (In one example embodiment, the softmax function 236 is implemented in software and runs on a general-purpose computer, graphical processing units (GPUs), and the like.) This architecture elegantly replaces a conventional hybrid ASR system including a separate acoustic model, a language model, a pronunciation lexicon, and decoder components.

An RNN-T models the conditional distribution $p(y|x)$ of an output sequence $y=(y_1, \ldots, y_U) \in Y^*$ of length U given an input sequence $x=(x_1, \ldots, x_T) \in X^*$ of length T. In an ASR setting, while the elements of x are continuous multidimensional speech features, y is discrete and corresponds to an output symbol set, such as the grapheme set of the language being modelled by the network. To facilitate the alignment of the two sequences, which in general have different lengths, the output alphabet is augmented with an additional BLANK symbol. The probability $p(y|x)$ is computed by marginalizing over all possible alignments between x and y.

The probability of a particular alignment is computed in terms of embeddings, $\bar{h}^{enc}$, of the input sequence computed by the encoder network 224 and embeddings, $h^{pred}$, of the output sequence computed by the prediction network 228. The joint network 232 combines these two embeddings into z to produce a posterior distribution over the output symbols for every time frame and symbol position. Training is based on an efficient forward-backward algorithm, with T×U complexity for both loss and gradient computation, that minimizes $-\log p(y|x)$, the negative log-likelihood loss ($L_{RNNT}$), and uses speech data paired with corresponding text transcripts.

As shown in FIG. 1, the RNN-T models are trained on multi-speaker utterances $\tilde{x}$ constructed by concatenating multiple single speaker utterances, in this example, two segments $x_1$ and $x_2$. For the exemplary multi-speaker data augmentation scheme (described in detail below), a teacher network 220 (also referred to as Single Speaker (SSP) Encoder Network 220 herein) is employed to produce embeddings corresponding to each of the single speaker feature sequences. These embedding sequences are concatenated together to form a single sequence $h^{enc}=(h_1^{enc}, h_2^{enc})$. Embeddings from the multi-speaker input $\bar{h}^{enc}$ are trained to be close to $h^{enc}$ via a mean squared error loss ($L_{MSE}$) to encourage the model to be robust to speaker changes and also to be able to process longer duration utterances. The teacher encoder network 220 is the encoder network of a similar RNN-T model trained on single speaker utterances with just the RNN-T loss, $L_{RNNT}$. The RNN-T model trained with the proposed data augmentation technique is trained on a combined loss $L=L_{RNNT}+\alpha L_{MSE}$, where a is a weight empirically selected to scale both losses to a similar dynamic range as well as to balance the contribution of each loss. (In general, the objective function can be generalized to a total loss equal to a classification loss (such as the RNN-T loss) plus a representation similarity loss Other examples of the classification loss include cross entropy (e.g., for attention-based encoder decoder models), connectionist temporal classification (described more fully below), expected WER based on sampling, and the like. Other examples of the representation similarity loss include specific losses such as cosine similarity, L1 loss, L1+L2 loss, Lp norm, and the like.) This training objective is different from prior art techniques wherein long-form training examples are also created and two training objectives, the RNN-T loss and the minimum word error rate (MWER) loss, are combined in a two-stage training recipe or from prior art techniques where a simple concatenation of utterances is employed. Unlike prior art techniques, one or more embodiments provide an on-the-fly augmentation method where random segments are combined to construct longer multi-speaker utterances. For completeness, note that in one or more embodiments, the encoder of the SSP teacher network is used to produce embeddings corresponding to single speaker utterances.

Multi-Speaker Data Augmentation

Figure 2:
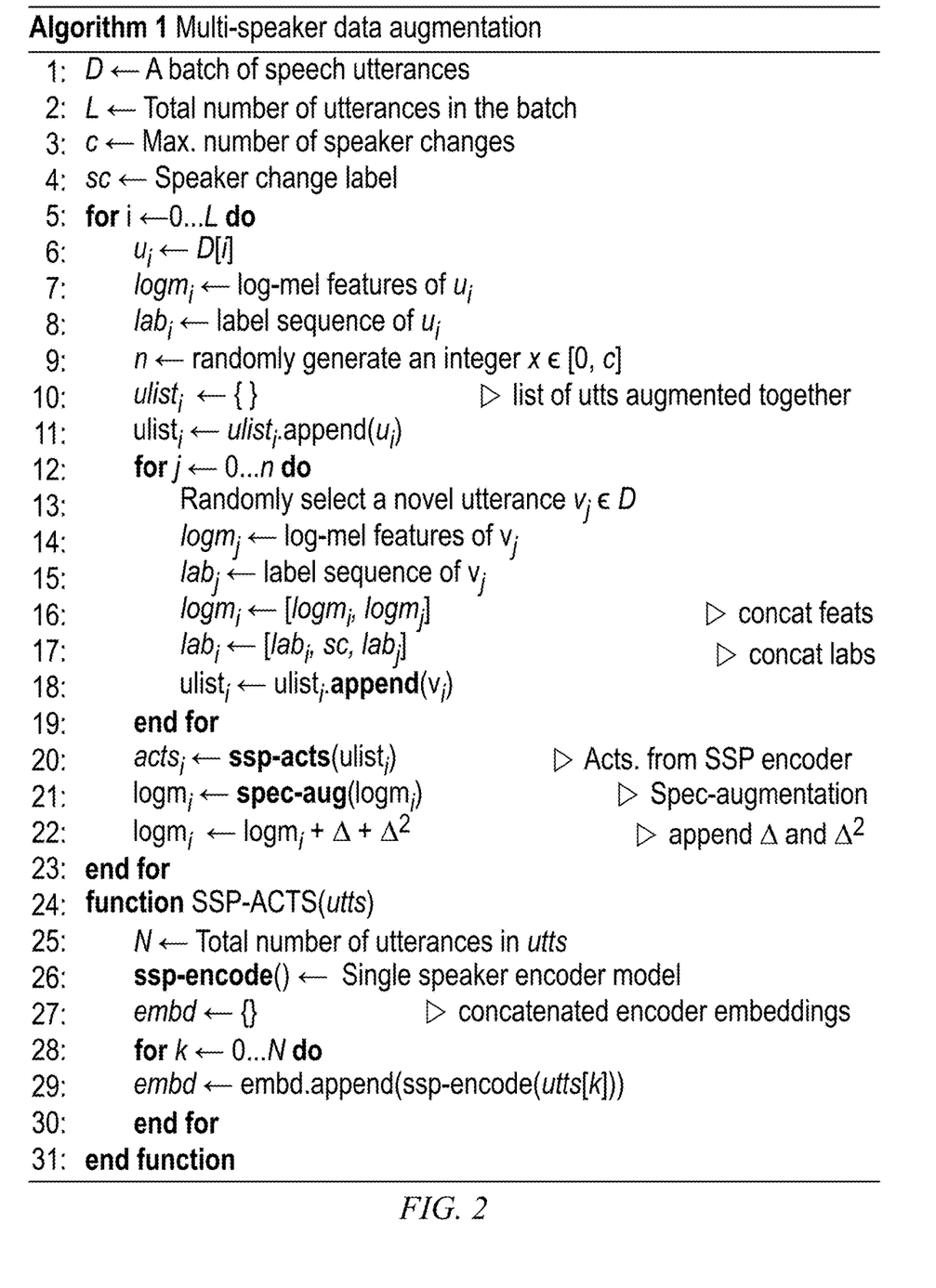
FIG. 2 is an example algorithm for multi-speaker data augmentation, in accordance with an example embodiment.

FIG. 2 is an example algorithm for multi-speaker data augmentation, in accordance with an example embodiment. As outlined in Algorithm 1, this augmentation technique works on-the-fly on existing speech data that has been batched from training. Depending on the desired maximum number of speaker changes (see line #3), a pertinent operation is to pick other unique utterances from the same batch and append them together at the log-mel feature level (see line #16). The number of utterances that are appended together is variable and randomly selected (see line #9). For an example maximum number of speaker changes of three, the algorithm can produce single speaker utterances without any speaker change or multi-speaker sentences with, for example, 1, 2 or 3 speaker changes (see lines #12-19). The skilled artisan will be familiar with log energy representations of the short-term power spectrum of speech, derived by binning the log power spectrum on a nonlinear scale of frequency, for example, the mel-frequency scale.

Each time an utterance is appended, the original label sequence is also modified to include the label sequence of the appended utterance along with a speaker change symbol (see line #17). With these operations, the algorithm essentially generates multi-speaker, long-form sentences from the short-form training data. In addition to creating multi-speaker data, the algorithm also employs the encoder network 220 of a pre-trained RNN-T acoustic model. This teacher network 220 is trained on the original single speaker utterances and is used to derive acoustic embeddings corresponding to the utterances in isolation as single speaker utterances (see lines #20 and #24-31). Since it has been observed that E2E models work well on matched single speaker utterances, the activations of the multi-speaker network being trained will be guided to resemble these activations from the teacher network 220. Aside from these operations, other commonly used techniques for data augmentation and regularization can be easily integrated into this feature extraction process.

As described above, multi-speaker data augmentation may be performed by selecting two or more utterances from the original training data and concatenating them together, as illustrated in FIG. 2. Without loss of generality, consider two utterances $u_i$ and $v_j$ with corresponding log-mel features $logmel_i$ and $logmel_j$, respectively. Concatenating the two utterances results in concatenated log-mel features $[logmel_i, logmel_j]$. In one example embodiment, a representation similarity term in the objective function encourages the following acoustic embeddings to be similar:

[teacher_encode(logmel$_i$)teacher_encode(logmel$_j$)]
≅student_encode(logmel$_i$logmel$_j$).

In one example embodiment, this framework is generalized to augment data by splitting utterances in the training data. This has the beneficial effect of exposing the model to a diverse variety of utterance lengths which can improve performance and robustness. Assume that a speech alignment model (such as a so-called hybrid models that, given a speech audio file and reference transcript, can assign starting and ending times of each word in the transcript). Having such times, the algorithm can split the training utterance into two or more segments at word boundaries. Selection of the splitting point may be based on a heuristic, such as choosing the longest silence or simply random. Assume the split results in two segments: $logmel_i$ and $logmel_j$. The representation similarity term is modified such that the two embeddings are encouraged to be similar, as defined below:

[teacher_encode(logmel$_i$,logmel$_j$)]≅[student_encode
(logmel$_i$),student_encode(logmel$_j$)]

In some instances, the alignment model may not be necessary. The splitting point(s) do not need to be aligned with word boundaries, but could be random, occur at regular intervals, and the like. In one example embodiment, a chunking model appropriate for streaming applications is used, where utterances are split uniformly into chunks, such as chunks of one second in length. In this case, these embeddings are encouraged to be similar, as defined below:

teacher_encode[concat(logmel$_k$)]≅concat(student_encode(logmel$_k$)).

Once this data augmentation procedure is integrated into the feature extraction process, an RNN-T model can be trained as described earlier. As shown in FIG. 1, in addition to the RNN-T loss, a mean squared error (MSE) loss is introduced to map the acoustic embeddings encoding of the multi-speaker utterances. By mapping internal embeddings to those corresponding to short duration, single speaker embeddings, the MSE loss hence encourages the model to produce embeddings that are invariant to speaker change and also make the model robust to deletion issues observed with longer utterances. As described earlier, in one example embodiment, the final training loss of an RNN-T model using example embodiments is given by $L=L_{RNNT}+\alpha L_{MSE}$. Although aspects of the experiments were based on RNN-T models, example embodiments can be adopted to train other classes of E2E models.

EXPERIMENTS AND RESULTS

Training Single and Multi-Speaker Models

The RNN-T models used in the disclosed experiments are trained on a collection of 2,000 hours of publicly-available speech datasets (also referred to as test sets and evaluation sets herein). Each RNN-T model has several sub-networks, as illustrated in FIG. 1. The transcription network contains six bidirectional Long Short-term Memory (LSTM) layers with 640 cells per layer per direction. The prediction network is a single unidirectional LSTM layer with only 768 cells. The joint network projects the 1280-dimensional stacked encoder vectors from the last layer of the transcription net and the 768-dimensional prediction net embedding each to 256 dimensions, combines them multiplicatively, and applies a hyperbolic tangent. Finally, the output is projected to 42 logits, corresponding to 41 characters plus BLANK, followed by a soft-max. The RNN-T based ASR models are trained using 40-dimensional, global mean and variance normalized log-Mel filterbank features, extracted every 10 milliseconds (ms). These features are augmented with Δ and Δ² coefficients, every two consecutive frames are stacked, and every second frame is skipped, resulting in 240-dimensional vectors every 20 ms. The speech data is augmented using speed and tempo perturbation with values in {0.9, 1.1} for both speed and tempo separately, resulting in four additional speech training data replicas. A conventional spectrogram augmentation technique with conventional settings was used in example experiments. The RNN-T models are trained using an open source machine learning framework on A100 graphical processing units (GPUs) for 20 epochs using a conventional optimizer. The maximum learning rate was set to $2\times10^{-4}$ and the one cycle learning rate policy includes a linear warmup phase from $2\times10^{-5}$ to $2\times10^{-4}$ over the first six epochs followed by a linear annealing phase to 0 for the remaining 14 epochs. An effective batch size of 32 utterances was used to train on the full 10K hours of speech data.

For the exemplary experiments, an RNN-T model (SNG) was first trained on only single speaker utterances. The encoder network of this model serves as the teacher network (SSP Encoder) to produce target embeddings during multi-speaker training. Next, a similar RNN-T model (MLT-MSE) was trained with the proposed multi-speaker augmentation scheme. While training this model, $L_{MSE}$ was scaled by $\alpha=100$. The maximum number of speaker changes was set to 1. All these parameters were optimized on a smaller 300-hour fifth conventional setup for speed and word error rate (WER) performance. Using other parameter values, 10 and 1000 for α, had minimal impact on WER. The output symbol set was also expanded to 43 to include an additional speaker change label.

Evaluations on Single and Multi-Speaker Test Sets

Figure 3:
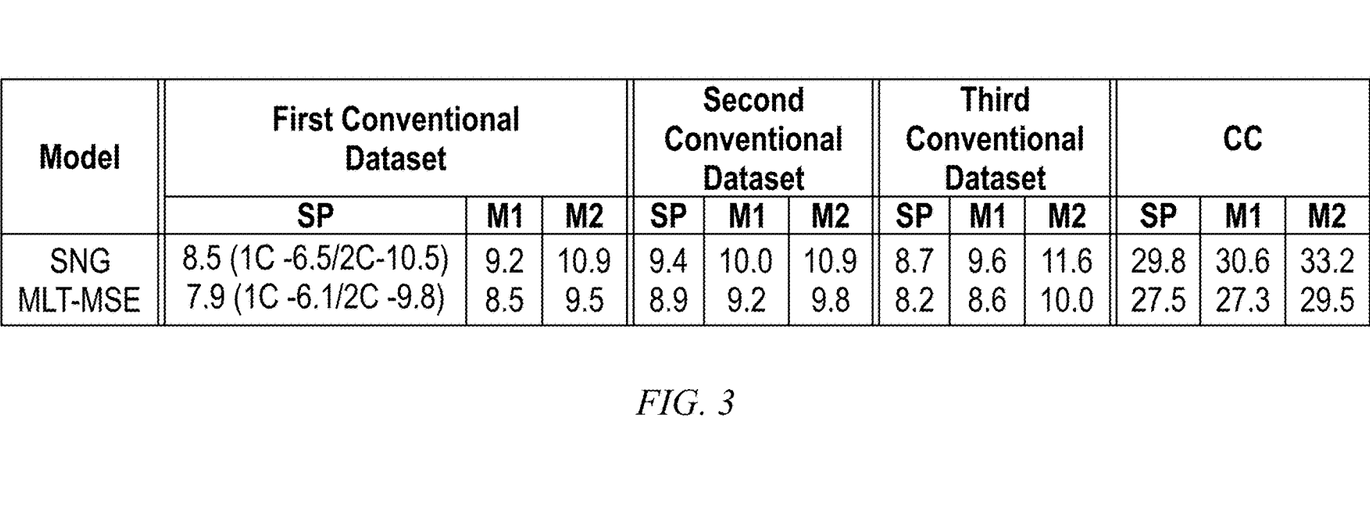
FIG. 3 is a table showing the word error rate (WER) percentage on various conversational telephony test sets, in accordance with an example embodiment.

FIG. 3 is a table showing the WER percentage on various conversational telephony test sets, in accordance with an example embodiment. Both these models were then evaluated on several single speaker (SP) and multi-speaker (M1/M2) test sets, as shown in the table of FIG. 3. The fifth conventional dataset and a sixth conventional dataset results are shown separately for a first conventional dataset along with the combined results across other test sets for various evaluations. (It is noted that the fifth conventional dataset and the sixth conventional dataset are components of the first conventional dataset.) Results are reported on three commonly used test sets—the first conventional dataset, the second conventional dataset and a third conventional dataset. Each of these test sets are processed according to known segmentation provided by a non-profit consortium and scored using WER scoring scripts of an open-source speech recognition toolkit. In addition to these test sets, these models were also evaluated on an internal test set (CC) with close to 5 hours of real call center conversations. Results on the first conventional dataset and the sixth conventional dataset were separately reported. Combined scores are shown for all the test sets (datasets).

To evaluate the performance of the SNG and MLT-MSE models in multi-speaker settings, two variants of multi-speaker test sets were constructed from each of the original single speaker test sets. Sorted by time, the adjacent segments of the single speaker test set are contextually related and belong to either the preceding speaker or the same speaker. The multi-speaker M1 test set is constructed by concatenating audio files of adjacent segments of the original single speaker set. The multi-speaker M2 test set is constructed to be harder by first shuffling the single speaker set and then concatenating adjacent segments. (By "harder", it is meant that it is more difficult for the model to process because the adjacent segments are not related-they very likely belong to different speakers and there might not be any continuity in sentence. This results in a higher Word Error Rate (WER) and more instances of long sequence deletions. Note that all versions of the test set (SP, M1, M2) have the same amount of audio input and same number of reference words, so the WER can be accurately compared.) Adjacent segments that are concatenated are semantically unrelated and are likely to have more speaker and channel changes. The WERs on the internal dataset are higher because of significant acoustic and channel mismatch. The multi-speaker model improves WER over the single speaker model in these diverse settings as well.

Across all evaluation sets, it was observed that the MLT-MSE model performs better than the SNG model on both the single speaker and multi-speaker test sets. It is interesting to observe gains on the single speaker test sets and not just the multi-speaker test sets. The 7-14% relative improvement in performance is attributed to the MLT-MSE model's robustness to speaker change and also the ability to better process longer utterances in single utterance cases as well. It is hypothesized that the $L_{MSE}$ encourages the model to behave like the SNG model and hence improves performance further.

Ablation Studies
Reduction in Deletion Errors

Figure 4A:
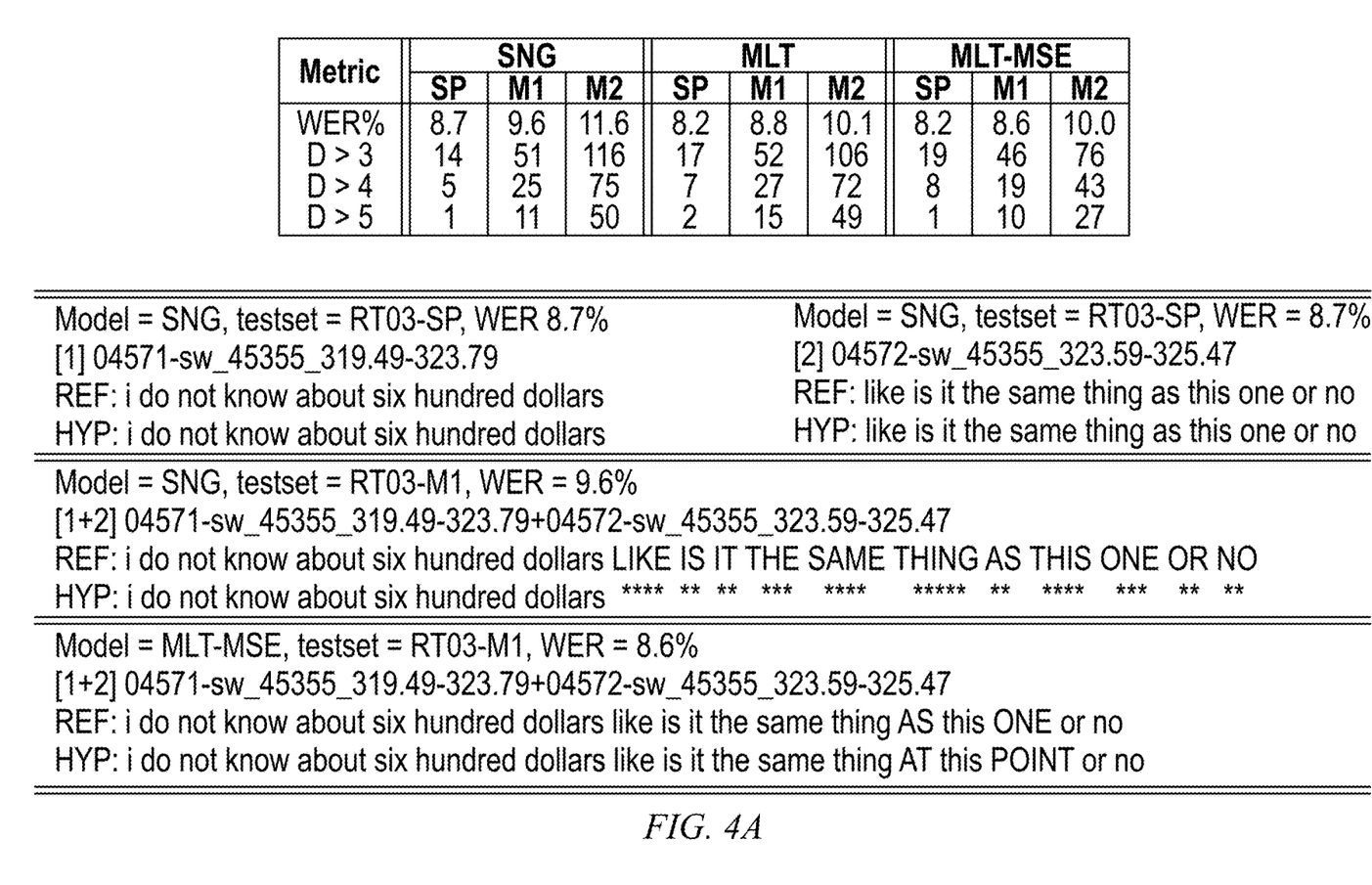
FIG. 4A is a table illustrating the deletion errors on single speaker and multi-speaker sentences from a conventional test set using the two example models, in accordance with an example embodiment.

The results on the third conventional test set were analyzed in more detail to highlight the difference between the SNG and MLT-MSE models and their performance. FIG. 4A is a table illustrating the deletion errors on single speaker and multi-speaker sentences from the third conventional test set using the SNG and MLT-MSE models, in accordance with an example embodiment. FIG. 4A also includes an example of long sequence deletion when the input is a longer audio file created by concatenating two utterances. Utterances 04571-sw 45355 319.49-323.79 and 04572-sw 45355 323.59-325.47 are first decoded by the single speaker model. When processed in isolation by the single speaker SNG model, both utterances are decoded without errors. However, when these adjacent segments are decoded as a single utterance, there is a deletion of 11 consecutive words by the SNG model. It is hypothesized that these errors are caused either by the speaker change present in the combined utterance or from train-test utterance length mismatch or both. One or more embodiments mitigate these kinds of errors by training models that can both handle speaker changes and also longer duration utterances. When the same concatenated utterance is now decoded with the multi-speaker MLT-MSE model, even though two substitution errors are made, there is no long word sequence deletion.

When the ASR deletes a long sequence of consecutive words, it is an indication of abnormal or undesirable behavior. More formally, the number of times more than D consecutive words were deleted was evaluated (the evaluation was repeated for D=3, D=4, and D=5). As an ablation study, an RNN-T model (MLT) was also trained on multi-speaker utterances but without the $L_{MSE}$ loss to evaluate the usefulness of this extra loss term. The results in the table of FIG. 4A validate the usefulness of the $L_{MSE}$ loss in training robust multi-speaker systems with substantial reduction in the number of long sequence deletions. (The third conventional test set results showing long sequence deletion counts with ablation study involving multi-speaker training without $L_{MSE}$.) On the multi-speaker M2 test set (which involved random shuffling before concatenation), the number of long sequence deletions is about twice as large as on the multi-speaker M1 test set. For D>4, the number of long sequence deletions is 75 for the SNG model. The MLT model reduces this number slightly to 72 while the MLT-MSE model reduces it much more to 43. Even though the WERs of the MLT model (WER=10.1%) and the MLT-MSE model (WER=10.0%) are very close, MLT-MSE has about 40% fewer long sequence deletions and is preferable to the MLT model.

Performance on Multi-Speaker Utterances

Figure 4B:
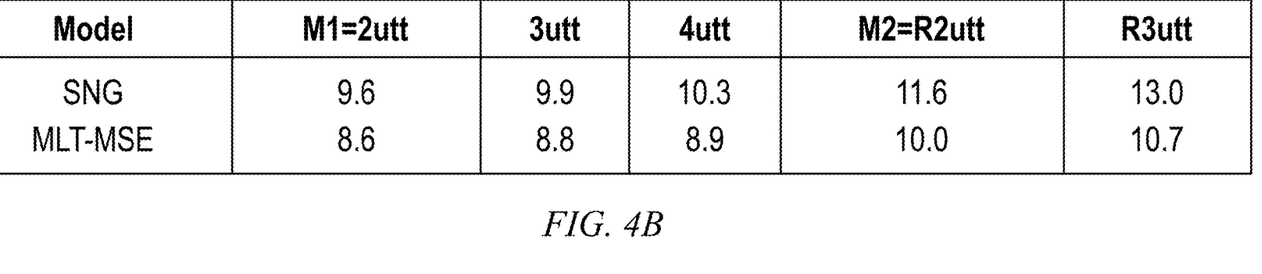
FIG. 4B is a table showing the results of evaluating example models on versions of the third conventional datasets with multiple speaker changes, in accordance with an example embodiment.

In addition to the results presented earlier on utterances with single speaker changes, example models were evaluated on more real world settings with test sets that have more than one speaker change. FIG. 4B is a table showing the results of evaluating the SNG and MLT-MSE models on versions of the third conventional datasets with multiple speaker changes, in accordance with an example embodiment. Compared to a test set of two appended utterances (2utt) with 1 speaker change, on newly created test sets of three appended utterances (3utt) and four appended utterances (4utt) with two and three speaker changes, respectively, the MLT-MSE model continues to significantly outperform the single speaker model. On harder test sets (such as a randomized test set of samples with two appended utterances (2utt) and a randomized test set of samples with three appended utterances (3utt)) constructed by first shuffling the single speaker set before concatenating adjacent segments (each segment likely a distinct speaker), still larger gains were observed in performance using MLT-MSE.

Robustness to Speaker Change

Figure 4C:
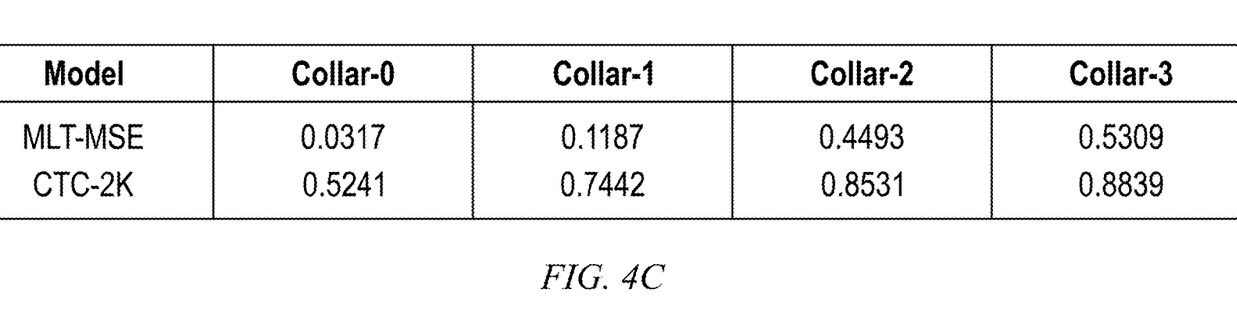
FIG. 4C is a table showing speaker change detection scores on the first conventional dataset, in accordance with an example embodiment.

To measure the effectiveness of the speaker change symbol used while concatenating utterances, the speaker change detection (F1 score) was measured using the multi-speaker RNN-T model (MLT-MSE) model on the multi-speaker first conventional test set (test set M1 in the table of FIG. 3). The performance was measured by also allowing a forgiveness collar of +1, +2 and +3 word positions. The table of FIG. 4C shows that the MLT-MSE model is quite agnostic to speaker change boundaries with its very low F1 scores, even though an explicit speaker change symbol was used. In a separate control experiment, with 2000 hours of a conventional dataset, a different RNN-T model was trained without the MSE loss but instead with a connectionist temporal classification (CTC) loss at the end of encoder network (CTC is an alignment-based loss indicative of how well aligned a model trained to minimize this loss has aligned an input feature sequence to its corresponding label sequence). FIG. 4C is a table showing speaker change detection scores on the first conventional dataset, in accordance with an example embodiment. From the results in the table of FIG. 4C, this explicit CTC loss, along with the regular RNNT loss, causes the CTC model (trained on 2,000 hours of training data) to learn the speaker change boundary much better compared to the MLT-MSE model. From these results, it is hypothesized that the speaker change detection is low because the $L_{MSE}$ loss encourages the model to process multi-speaker speech segments in a speaker independent fashion.

Leveraging Context with Multi-Speaker Models

In the next set of experiments, the disclosed multi-speaker models were applied to process utterances in conversational dialog settings with relevant context from dialog history. Context in these dialogs can be defined in multiple ways. In the example from the first conventional dataset shown below, the dialog context for 0002 can be either chosen as the preceding utterance in time, 0001 from a different speaker, or 0000 from the same speaker. When 0002 is decoded, it can be decoded in context by concatenating the features from either 0001 or 0000.

en 4156 A 0000 WELL I AM GOING TO HAVE MINE IN TWO MORE CLASSES
en 4156 B 0001 YOU ARE KIDDING
en 4156 A 0002 NO I AM NOT WELL THEN I HAVE TO TAKE MY EXAMS MY ORALS BUT

Figure 5:
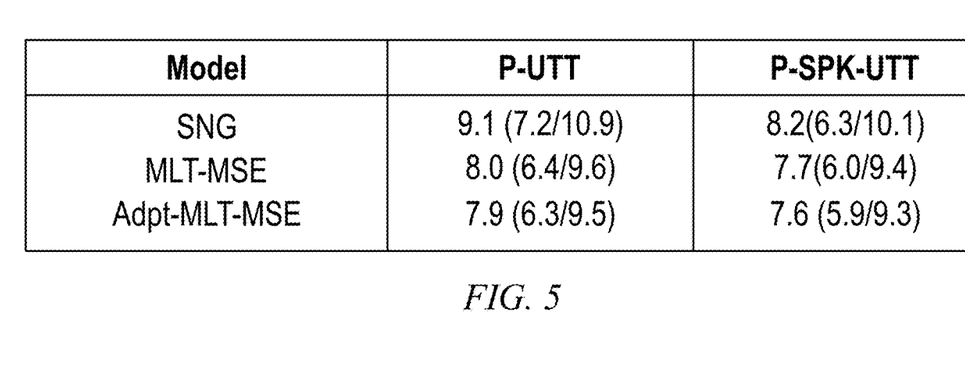
FIG. 5 is a table showing the results of decoding the first conventional dataset in two different context settings, in accordance with an example embodiment.

FIG. 5 is a table showing the results of decoding the first conventional dataset in the two different context settings described above, in accordance with an example embodiment. (The table includes the WER % on the first conventional dataset with additional history from preceding utterances and component (such as a first component and a second component of the first conventional dataset) results). As an aside, note that in FIG. 3, the first component and the second component of the first conventional dataset are labeled as 1C and 2C. P-UTT is the case where the previous utterance in time is appended to the current utterance being decoded. P-SPK-UTT is the setting in which the utterance that is concatenated is the current speaker's previous utterance in time. While P-UTT involves speaker changes, P-SPK-UTT does not involve speaker changes. Since the context is known explicitly, the log-mel, Δ and Δ2 coefficients are computed separately for each utterance before they are concatenated. This is in contrast to previous experiments where the features are computed over concatenated utterances without knowing where segment boundaries are. The decoded outputs of each utterance are also scored with the decodes of their context in place. The single speaker SNG model performs better at 8.2% WER in the P-SPK-UTT case than 9.1% in the P-UTT case because there are no speaker changes. The MLT-MSE model improves in both cases showing robustness to processing longer utterances, robustness to speaker changes, and integration of contextual information. The MLT-MSE model is adapted on just the fifth conventional dataset with contextual information appended to each utterance. When the MLT-MSE model was originally trained on this dataset, utterances were randomly concatenated and the model does not learn to use the full dialog context effectively. The adapted model improves performance further by up to 14% compared to the SNG model by capturing useful contextual information.

Given the discussion thus far, it will be appreciated that, in general terms, an exemplary method, according to an aspect of the invention, includes the operations of concatenating, using a hardware processor, features of two or more single speaker utterances together and concatenating, using the hardware processor, corresponding labels of the two or more single speaker utterances together; generating, using the hardware processor and a single speaker teacher encoder network (220), single speaker acoustic embeddings for each of the single speaker utterances of the concatenated single speaker utterances; and training, using the hardware processor, an enhanced model (224, 228, 232) on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network (220). It is noted that the enhanced model is improved with the utilization of the cited losses and the augmentation of training data with the above concatenation technique.

In one example embodiment, the single speaker teacher encoder network (220) is trained on single speaker training utterances using the classification loss to construct the single speaker teacher encoder network (220) for deriving the single speaker acoustic embeddings.

In one example embodiment, the enhanced model (224, 228, 232) is deployed and inferencing is carried out using the enhanced model (224, 228, 232).

In one example embodiment, one or more utterances are selected for data augmentation from a batch of training data, each utterance having a corresponding label sequence; the one or more utterances are appended together at a log-mel feature level (line #16); a concatenated label sequence is generated based on the corresponding label sequences of the appended utterances (line #17); and deployment of the appended utterances (optionally, on the fly) for the training of the enhanced model is facilitated. Concatenation can also be done offline; it just needs more disk storage. Note that a distinction can be made between model and encoder network wherein model means a combination of neural networks as in the case of the RNNT network that is used for doing ASR; the enhanced model can be thought of as an enhanced automatic speech recognition model.

In one example embodiment, the concatenated single speaker utterances are labeled with an indication of a speaker change and the training the enhanced model is based on the speaker change label.

In one example embodiment, a count of utterances that are concatenated together for generating the single speaker acoustic embeddings is variable and randomly selected (line #9).

In one example embodiment, the concatenated single speaker utterances comprise utterances from multiple speakers.

In one example embodiment, the representation similarity loss encourages the enhanced model (224, 228, 232) to produce embeddings that are invariant to speaker change and robust to deletion issues observed with longer utterances by mapping internal embeddings to the single speaker acoustic embeddings.

In one example embodiment, a final training loss of the classification model is given by $L=L_{CLASS}+\alpha L_{REP}$, where a is a weight empirically selected to scale both the $L_{CLASS}$ and $L_{REP}$ losses to a similar dynamic range and to balance a contribution of each of the $L_{CLASS}$ and $L_{REP}$ losses.

In one example embodiment, a final training loss of the classification model is given by $L=L_{CLASS}+\alpha L_{REP}+\beta L_{CTC}$, where $\alpha$ and $\beta$ are weights empirically selected to optimize performance and $L_{CTC}$ is a connectionist temporal classification loss corresponding to a speaker change (CTC loss for speaker change). In one example embodiment, additional losses may be integrated into the final training loss of the classification model.

In one aspect ("splitting aspect"), splitting, using a hardware processor, features of a given single speaker utterance into two or more utterances and using labeling of the given single speaker utterance; generating, using the hardware processor and a single speaker teacher encoder network (220), single speaker acoustic embeddings of the given single speaker utterance; and training, using the hardware processor, an enhanced model (224, 228, 232) on the split single speaker utterances using a classification loss $L_{CLASS}$ and a representation similarity loss $L_{REP}$, the representation similarity loss $L_{REP}$ defined to influence an embedding derived from the split single speaker utterances, the influence being based on the single speaker acoustic embeddings derived from the single speaker teacher encoder network (220). As appropriate, the trained enhanced model can be deployed and used to carry out inferencing.

In one aspect, a computer program product comprises one or more tangible computer-readable storage media and program instructions stored on at least one of the one or more tangible computer-readable storage media, the program instructions executable by a processor, the program instructions comprising concatenating features of two or more single speaker utterances together and concatenating corresponding labels of the two or more single speaker utterances together; generating, using a single speaker teacher encoder network (220), single speaker acoustic embeddings for each of the single speaker utterances of the concatenated single speaker utterances; and training an enhanced model (224, 228, 232) on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network (220).

Similarly, a computer program product can include one or more tangible computer-readable storage media and program instructions stored on at least one of the one or more tangible computer-readable storage media, the program instructions executable by a processor, the program instructions comprising the steps of the splitting aspect.

In one aspect, a system comprises a memory and at least one processor, coupled to the memory, and operative to perform operations comprising concatenating features of two or more single speaker utterances together and concatenating corresponding labels of the two or more single speaker utterances together; generating, using a single speaker teacher encoder network (220), single speaker acoustic embeddings for each of the single speaker utterances of the concatenated single speaker utterances; and training an enhanced model (224, 228, 232) on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network (220).

Similarly, a system can include a memory and at least one processor, coupled to the memory, and operative to perform operations comprising the steps of the splitting aspect.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
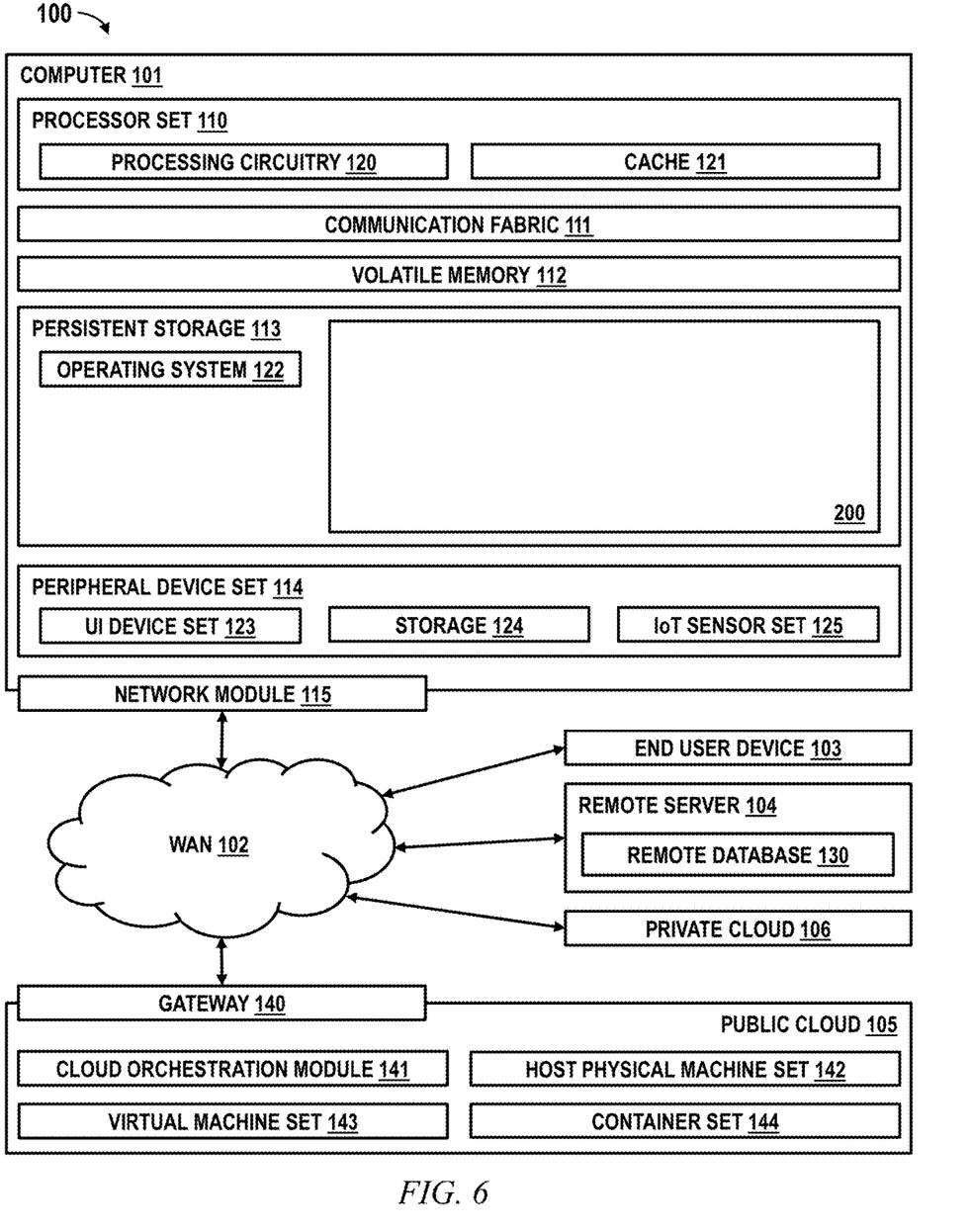
FIG. 6 depicts a computing environment according to an embodiment of the present invention.

Computing environment 100 contains an example of an environment for the execution of at least some of the computer code involved in performing the inventive methods, such as automatic speech recognition system 200; for example, implementing aspects of multi-speaker data augmentation for improved end-to-end automatic speech recognition as set forth herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
concatenating, using a hardware processor, features of two or more single speaker utterances together and concatenating, using the hardware processor, corresponding labels of the two or more single speaker utterances together;
generating, using the hardware processor and a single speaker teacher encoder network, single speaker acoustic embeddings for each of the single speaker utterances of the concatenated single speaker utterances; and
training, using the hardware processor, an enhanced model on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network.

2. The method of claim 1, further comprising training the single speaker teacher encoder network on single speaker training utterances using the classification loss to construct the single speaker teacher encoder network for deriving the single speaker acoustic embeddings.

3. The method of claim 1, further comprising deploying the enhanced model and carrying out inferencing using the enhanced model.

4. The method of claim 1, further comprising:
selecting one or more utterances for data augmentation from a batch of training data, each utterance having a corresponding label sequence;
appending the one or more utterances together at a log-mel feature level;
generating a concatenated label sequence based on the corresponding label sequences of the appended utterances; and
facilitating deploying the appended utterances for the training of the enhanced model.

5. The method of claim 1, further comprising labeling the concatenated single speaker utterances with an indication of a speaker change and wherein the training the enhanced model is based on the speaker change label.

6. The method of claim 1, wherein a count of utterances that are concatenated together for generating the single speaker acoustic embeddings is variable and randomly selected.

7. The method of claim 1, wherein the concatenated single speaker utterances comprise utterances from multiple speakers.

8. The method of claim 1, wherein the representation similarity loss encourages the enhanced model to produce embeddings that are invariant to speaker change and robust to deletion issues observed with longer utterances by mapping internal embeddings to the single speaker acoustic embeddings.

9. The method of claim 1, wherein a final training loss of the classification model is given by $L=L_{CLASS}+\alpha L_{REP}$, where $\alpha$ is a weight empirically selected to scale both the $L_{CLASS}$ and $L_{REP}$ losses to a similar dynamic range and to balance a contribution of each of the $L_{CLASS}$ and $L_{REP}$ losses.

10. The method of claim 1, wherein a final training loss of the classification model is given by $L=L_{CLASS}+\alpha L_{REP}+\beta L_{CTC}$, where $\alpha$ and $\beta$ are weights empirically selected to optimize performance and $L_{CTC}$ is a connectionist temporal classification loss corresponding to a speaker change.

11. A method, comprising:
splitting, using a hardware processor, features of a given single speaker utterance into two or more utterances and using labeling of the given single speaker utterance;
generating, using the hardware processor and a single speaker teacher encoder network, single speaker acoustic embeddings of the given single speaker utterance; and
training, using the hardware processor, an enhanced model on the split single speaker utterances using a classification loss $L_{CLASS}$ and a representation similarity loss $L_{REP}$, the representation similarity loss $L_{REP}$ defined to influence an embedding derived from the split single speaker utterances, the influence being based on the single speaker acoustic embeddings derived from the single speaker teacher encoder network.

12. A computer program product, comprising:
one or more tangible computer-readable storage media and program instructions stored on at least one of the one or more tangible computer-readable storage media, the program instructions executable by a processor, the program instructions comprising:
concatenating features of two or more single speaker utterances together and concatenating corresponding labels of the two or more single speaker utterances together;
generating, using a single speaker teacher encoder network, single speaker acoustic embeddings for each of the single speaker utterances of the concatenated single speaker utterances; and
training an enhanced model on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network.

13. A system comprising:
a memory; and
at least one processor, coupled to said memory, and operative to perform operations comprising:
concatenating features of two or more single speaker utterances together and concatenating corresponding labels of the two or more single speaker utterances together;
generating, using a single speaker teacher encoder network, single speaker acoustic embeddings for each of the single speaker utterances of the concatenated single speaker utterances; and
training an enhanced model on the concatenated single speaker utterances using a classification loss $L_{CLASS}$ and a representation similarity loss $L_{REP}$, the representation similarity loss $L_{REP}$ defined to influence an embedding derived from the concatenated single speaker utterances, the influence being based on the single speaker acoustic embeddings derived from the single speaker teacher encoder network.

14. The system of claim 13, wherein the at least one processor is further operative to perform operations comprising training the single speaker teacher encoder network on single speaker training utterances using the classification loss to construct the single speaker teacher encoder network for deriving the single speaker acoustic embeddings.

15. The system of claim 13, wherein the at least one processor is further operative to perform operations comprising deploying the enhanced model and carrying out inferencing using the enhanced model.

16. The system of claim 13, wherein the at least one processor is further operative to perform operations comprising:
selecting one or more utterances for data augmentation from a batch of training data, each utterance having a corresponding label sequence;
appending the one or more utterances together at a log-mel feature level;
generating a concatenated label sequence based on the corresponding label sequences of the appended utterances; and
facilitating deploying the appended utterances for the training of the enhanced model.

17. The system of claim 13, wherein the at least one processor is further operative to perform operations comprising labeling the concatenated single speaker utterances with an indication of a speaker change and wherein the training the enhanced model is based on the speaker change label.

18. The system of claim 13, wherein a count of utterances that are concatenated together for generating the single speaker acoustic embeddings is variable and randomly selected.

19. The system of claim 13, wherein the concatenated single speaker utterances comprise utterances from multiple speakers.

20. The system of claim 13, wherein the representation similarity loss encourages the enhanced model to produce embeddings that are invariant to speaker change and robust to deletion issues observed with longer utterances by mapping internal embeddings to the single speaker acoustic embeddings.

* * * * *